United States Patent [19]

Tohyama et al.

[11] Patent Number: 5,041,843

[45] Date of Patent: Aug. 20, 1991

[54] METHOD AND APPARATUS FOR TRANSFERRING AN ADHESIVE VISCOUS SUBSTANCE CORRESPONDING TO THE RATIO OF THE AREA OF AN ELECTROCONDUCTION PORTION OF A PATTERN ON ONE ELECTRODE TO THE AREA OF AN INSULATING PORTION OF THE PATTERN OF THE ELECTRODE

[75] Inventors: Noboru Tohyama, Kawasaki; Kenichi Matsumoto, Tokyo; Kyo Miura, Yokohama; Kohzoh Arahara, Kawasaki; Takashi Kai, Hadano; Toshiya Yuasa, Kawasaki, all of Japan

[73] Assignee: Canon Kabushiki Kaisha, Tokyo, Japan

[21] Appl. No.: 413,472

[22] Filed: Sep. 27, 1989

[30] Foreign Application Priority Data

Oct. 4, 1988 [JP] Japan ............................ 63-250168

[51] Int. Cl.⁵ ..................... G01D 15/16; B65G 54/00

[52] U.S. Cl. ................................ 346/1.1; 346/140 R

[58] Field of Search ................ 346/1.1, 76 R, 76 PH, 346/150, 139 R, 140 R, 134, 138, 135.1; 106/20, 22, 280; 355/256, 258; 118/659; 101/450.1, 453, 463.1, 465, 466, 467, 468

[56] References Cited

U.S. PATENT DOCUMENTS

| | | | |
|---|---|---|---|
| 4,080,897 | 3/1978 | Gundlach | 101/467 |
| 4,387,382 | 6/1983 | Kuhashi | 346/140 R |
| 4,725,154 | 2/1988 | Babsch | 346/76 P |
| 4,838,940 | 6/1989 | Kan | 106/20 |
| 4,855,763 | 8/1989 | Kan . | |
| 4,881,084 | 11/1989 | Kan | 346/140 R |

FOREIGN PATENT DOCUMENTS 63-30279 2/1988 Japan .

*Primary Examiner*—George H. Miller, Jr.
*Assistant Examiner*—Scott A. Rogers
*Attorney, Agent, or Firm*—Fitzpatrick, Cella, Harper & Scinto

[57] ABSTRACT

A method for supplying a viscous substance includes the step of providing a viscous substance having an adhesive characteristic which changes in correspondence to a polarity of a voltage applied thereto. The viscous substance has an adhesive characteristic when no voltage is applied thereto and its adhesiveness is reduced when a voltage is applied thereto. The method further includes the step of supplying the viscous substance between a pair of electrodes at least one of which has a pattern comprising an electroconductive portion and an insulating pattern. The method also includes the step of applying a voltage between the first and second electrodes to thereby attach the viscous substance in an amount which corresponds to the ratio of the area of the electroconductive portion to the area of the insulating portion.

17 Claims, 3 Drawing Sheets

METHOD AND APPARATUS FOR TRANSFERRING AN ADHESIVE VISCOUS SUBSTANCE CORRESPONDING TO THE RATIO OF THE AREA OF AN ELECTROCONDUCTION PORTION OF A PATTERN ON ONE ELECTRODE TO THE AREA OF AN INSULATING PORTION OF THE PATTERN OF THE ELECTRODE

FIELD OF THE INVENTION AND RELATED ART

The present invention relates to a method of supplying a viscous or adhesive substance wherein the amount of the viscous substance is controlled, and an image forming method and an image forming apparatus utilizing the same.

Hitherto, in a case wherein a viscous substance such as ink and adhesive is supplied to a printing plate or a surface to be bonded, the amount of the viscous substance to be supplied thereto is regulated by controlling the clearance between an ink fountain roller and an ink fountain blade (or bottom plate), the rotation angle of the ink fountain roller rotating intermittently, the movement of an ink ductor roller, etc.

However, in the above-mentioned conventional method, since the amount of the viscous substance to be supplied is mechanically controlled, there is a certain limit to the miniaturization of a device used therefor or reduction in noise produced therefrom Further, in the conventional method, craftsmanship is required in order to regulate the amount of the supply due to the influence of environmental changes, i.e., a change in temperature and/or humidity, and therefore it is difficult to practice a maintenance-free mode.

Incidentally, the technique using such a viscous substance also include printing. Our research group has proposed a printing process wherein a voltage is applied to an ink so as to change its adhesiveness, whereby a recording is effected (U.S. patent application Ser. No. 301,146). Our research group has also proposed a printing process wherein an ink remaining in the device used therefor is easily removed (U.S. patent application Ser. No. 325,986).

SUMMARY OF THE INVENTION

An object of the present invention is to provide a viscous substance supplying method which is capable of constantly providing a suitable amount of viscous substance with little noise without a change in environmental conditions.

Another object of the present invention is to provide an image forming method and image forming apparatus wherein a suitable amount of viscous substance may be supplied to a printing plate with little noise without being influenced by a change in environmental conditions.

According to the present invention, there is provided a method for supplying a viscous substance, comprising:

providing a viscous substance capable of changing its adhesiveness corresponding to the polarity of a voltage to be applied thereto;

supplying the viscous substance between a pair of electrodes at least one of which has a pattern comprising an electroconductive portion and an insulating portion; and applying a voltage between the pair of electrodes thereby to attach to at lease one of the pair of electrodes the viscous substance of which amount corresponds to the area ratio between the electroconductive portion and the insulating portion.

The present invention also provides an image forming method, comprising:

providing an ink capable of changing its adhesiveness corresponding to the polarity of a voltage applied thereto;

supplying the ink between a pair of electrodes at least one of which has a pattern comprising an electroconductive portion and an insulating portion;

applying a voltage between the pair of electrodes thereby to attach the ink to at least one of the pair of the electrodes;

supplying the ink attached to the at least one electrode to a printing plate having a pattern of ink receptibility; and transferring the ink from the printing plate to a transfer-receiving medium to form thereon an ink image corresponding to the pattern of the ink receptibility.

The present invention further provides an image forming apparatus, comprising:

a pair of electrodes at least one of which has a pattern comprising an electroconductive portion and an insulating portion;

means for supplying an ink between the pair of electrodes;

a power supply for applying a voltage between the pair of electrodes; and a printing plate having a pattern of ink receptibility;

whereby the ink attached to at least one of the pair of electrodes is supplied to the printing plate to form thereon an ink pattern corresponding to the pattern of ink receptibility.

These and other objects, features and advantages of the present invention will become more apparent upon a consideration of the following description of the preferred embodiments of the present invention taken in conjunction with the accompanying drawings.

DETAILED DESCRIPTION OF THE INVENTION

In the viscous substance-supplying method according to the present invention, there may be utilized a property of a viscous substance such as ink, such that when a voltage is applied thereto by means of a pair of electrodes-the viscous substance having an adhesiveness loses its adhesiveness to one of the electrodes.

Hereinbelow, the present invention is described with reference to the accompanying drawings.

Figure 1:
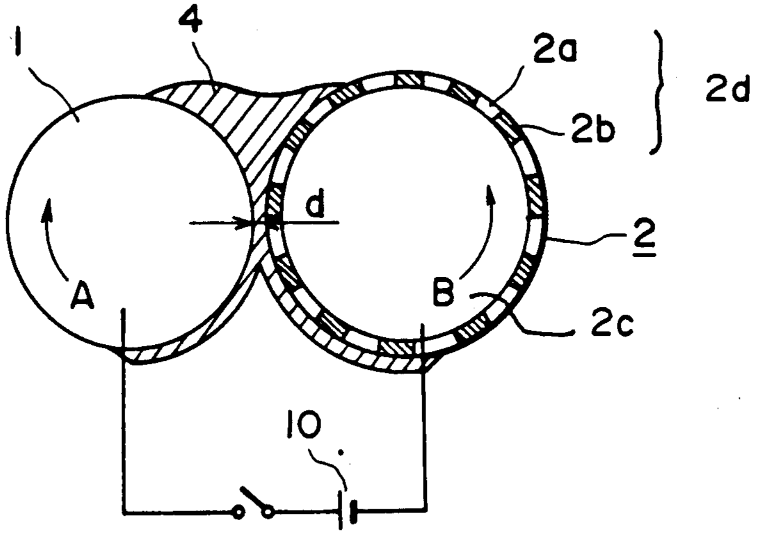
FIG. 1 is a schematic side sectional view showing an embodiment of the apparatus for practicing the viscous substance-supplying method according to the present invention, to which a voltage is not applied.

Referring to FIG. 1, a pair of electrodes 1 and 2 are cylindrical and driven by a driving device (not shown) so that they are rotatable in the directions of arrows A and B, respectively.

At least one of the above-mentioned electrodes 1 and 2 has a pattern comprising an electroconductive portion and an insulating portion. In the embodiment shown in FIG. 1, a pattern comprising an electroconductive portion 2*a* and an insulating portion 2*b* is formed in the electrode 2. More specifically, the electrode 2 may comprise a roller 2*c* and a pattern sheet 2*d* which comprises an electroconductive portion 2*a* and an insulating portion 2*b*, and is wound about the roller 2*c*.

The pattern sheet 2*d* may have various forms or structures. Specific examples thereof may include:

(1) a plate of a metal such as Al and Cu, and a pattern of an insulating material such as resin disposed on the metal plate;

(2) a plate of a metal such as Al and Cu, and a film of a photoconductive material (e.g., gelatin-silver halide, ZnO, selenium, amorphous silicon, and organic photoconductor) disposed thereon, which is patternwise exposed;

(3) a plate of an insulating material such as resin, and a pattern of an electroconductive ink formed thereon;

(4) one an insulating film wherein an electroconductive pattern is formed by electrical discharge mechanism;

(5) one a metal roller having a large number of projections on its peripheral surface, wherein an insulating material is disposed on the portion of the peripheral surface other than the and;

(6) one an insulating material to which a mesh or a screen of a metal is bonded; etc.

Alternatively, an insulating pattern may directly be formed on the peripheral surface of an electroconductive roller comprising a metal, an electroconductive rubber, etc., by using an insulating material such as resin, thereby to form an electrode 2.

On the other hand, an electroconductive pattern may directly be formed on the peripheral surface of an insulating roller thereby to form an electrode 2. In such a case, it is required that all of the electroconductive portions 2*a* constituting the electroconductive pattern are mutually connected electrically to each other.

Figure 4:
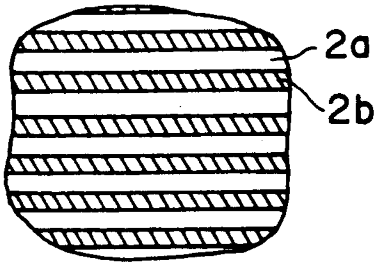
FIGS. 4 to 9 are partial schematic plan view each showing the pattern formed in an embodiment of the electrode to be used in the viscous substance-supplying method according to the present invention.
Figure 5:
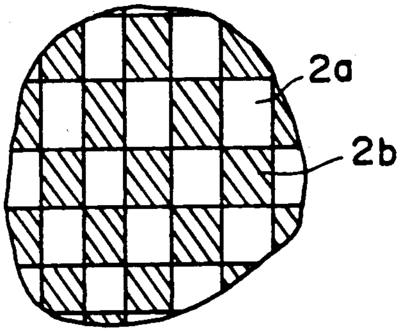
Figure 6:
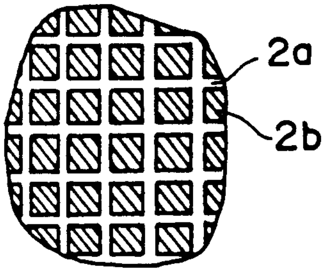
Figure 7:
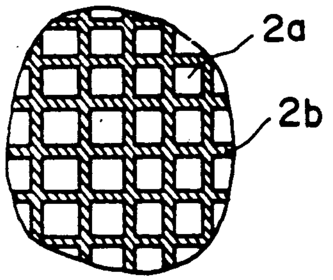
Figure 8:
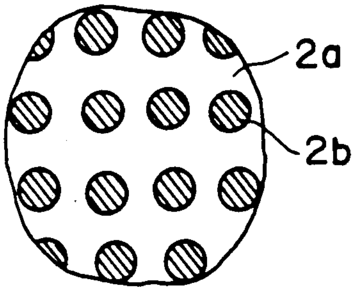
Figure 9:
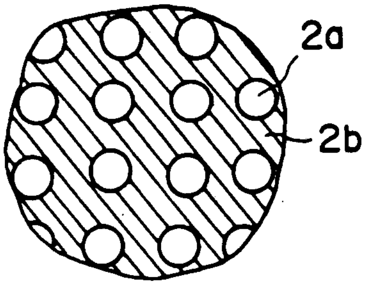

The pattern of the electrode 2 may preferably be a regular or systematic one, because the viscous substance supplied to the electrode 2 may easily be uniformized, e.g., in the thickness thereof. Specific examples of the regular pattern may include: a stripe pattern as shown in FIG. 4, a checker pattern as shown in FIG. 5, and dot patterns as shown in FIGS. 6 to 9.

When the above-mentioned pattern comprising an electroconductive portion 2*a* and an insulating portion 2*b* is formed, it is required that all of the electroconductive portions 2*a* constituting the electroconductive pattern are mutually connected electrically, and that the electroconductive portions 2*a* are not partially isolated.

Referring to FIG. 1, the electrode 1 comprises an electroconductive material. Examples thereof may include: metals such as aluminum, copper, stainless steel, platinum, gold, chromium, nickel, phosphor bronze, and carbon; electroconductive rubbers and electroconductive polymers; and dispersions obtained by dispersing metal filler, etc., in various polymers.

Now, referring to FIG. 1, a viscous substance 4 is supplied between electrodes 1 and 2, and these electrodes 1 and 2 are rotated in the directions of arrows A and B, respectively, in a state where no voltage is applied between the electrodes 1 and 2. At this time, the viscous substance 4 separately adheres to each of the electrodes 1 and 2 in substantially equal amounts, as shown in FIG. 1.

Figure 2:
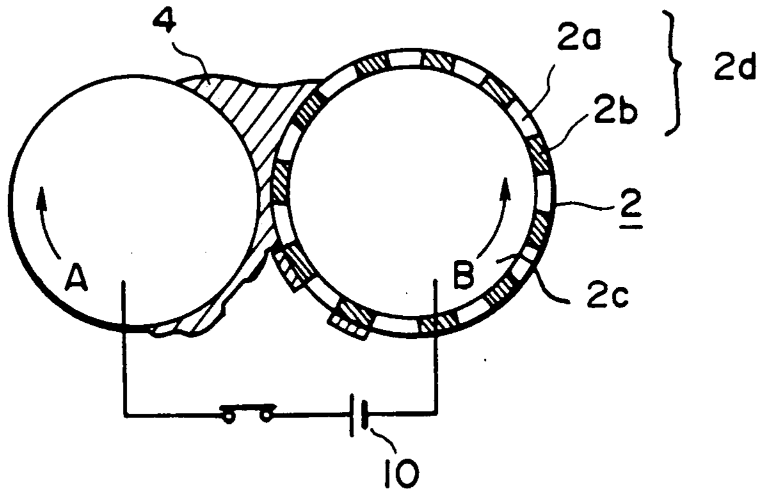
FIG. 2 is a schematic side sectional view of the apparatus shown in FIG. 1, to which a voltage is applied.

Then, referring to FIG. 2, a voltage is applied between the electrodes 1 and 2 by means of a power supply 10, the adhesiveness of the viscous substance 4 is reduced at the electroconductive portion 2*a* of the electrode 2, and the viscous substance 4 adheres to the insulating portion 2*b* of the electrode 2. Accordingly, the amount of the viscous substance 4 attached to the electrode 2 may be determined or regulated by the area ratio between the electro-conductive portion 2*a* and the insulating portion 2*b*.

More specifically, the amount of the viscous substance 4 attached to the electrode 2 is too large (or the amount of the viscous substance 4 attached to the electrode 1 is too small), an electrode 2 comprising an insulating portion 2*b* of a smaller area may be used. On the other hand, the amount of the viscous substance 4 attached to the electrode 2 is too small (or the amount of the viscous substance 4 attached to the electrode 1 is too large), an electrode 2 comprising an insulating portion 2*b* of a larger area may be used.

For example, it is assumed that 100 wt. parts of the viscous substance 4 is attached to the insulating portion 2*b* when the area ratio between the electroconductive portion 2*a* and insulating portion 2*b* is 1:1. In such a case, the amount of the viscous substance 4 attached to the insulating portion 2*b* becomes 50 wt. parts when the above-mentioned area ratio is 3:1, and the amount becomes 25 wt. parts when the area ratio is 7:1.

The voltage to be applied between the electrodes 1 and 2 may preferably be a DC voltage of 1–100 V, more preferably 5–80 V. If the voltage is below 1 V and the change from an adhesive state to a non-adhesive state may be insufficient. If the voltage exceeds 100 V, the power consumption undesirably becomes large.

The clearance d between the electrodes 1 and 2 may preferably be 5 mm or smaller, more preferably 1 mm or smaller. When an elastic or elastomeric material such as electroconductive rubber is used in the electrode 1, it is possible that d=0 mm.

When the viscous substance 4 attached to the electrode 2 or 1 is utilized, a suitable amount of the viscous substance 4 may constantly be obtained.

In the present invention, when the viscous substance 4 attached to the electrode 2 or 1 is used, a means for making uniform or smoothing the thickness of the viscous substance 4 attached to the electrode 2 or 1 may be used, as desired. For example, a smoothing member such as a blade or a roller may be caused to contact the viscous substance 4 attached to the electrode 2 or 1. Such a smoothing member may be vibrated as desired.

The smoothing means may comprise a metal, a rubber, etc., but may preferably comprise a rubber having a rubber hardness of 50–100 degrees, more preferably 60–90 degrees. When a roller is used as the smoothing member, the surface portion thereof may comprise a rubber.

Further, the smoothing means may be vibrated in the direction parallel to the rotation axis of the electrode 1 or 2, e.g., by means of a magnet such as a voice coil, or by a mechanical means such as cam.

When a roller is used as the smoothing member, the smoothing means may be driven so that it has a relative velocity to the electrode 1 or 2, with respect to their peripheral speeds. Further, the smoothing member in the form of a roller may be intermittently rotated by means of a stepping motor, etc.

In the embodiment described above with reference to FIGS. 1 and 2, the adhesiveness of the viscous substance 4 on the cathode side is decreased. In the present invention, however, the adhesiveness of a viscous substance on the anode side can be decreased depending on the kind of the viscous substance.

Figure 10:
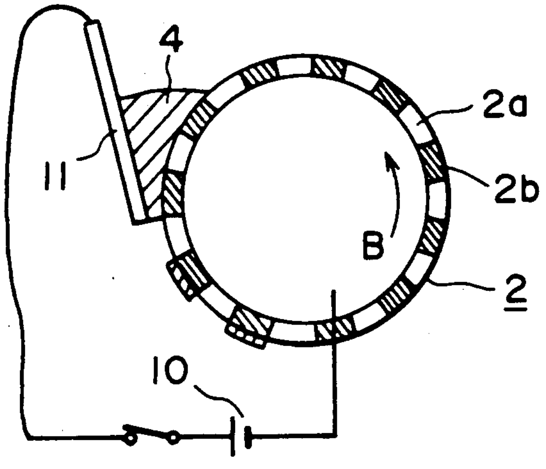
FIG. 10 is a schematic side sectional view showing another embodiment of the apparatus for practicing the viscous substance-supplying method according to the present invention.

Further, as shown in FIG. 10, a plate-like electrode 11 may be used instead of the electrode 1 shown in FIG. 1.

Hereinbelow, is discussed the viscous substance to be used in the viscous substance-supplying method according to the present invention.

In the present invention, there may be utilized some embodiments as follows, with respect to the mechanism wherein a viscous substance is converted from an adhesive state into a non-adhesive state under the application of a voltage.

(1) In one additional embodiment, the adhesiveness of the viscous substance is changed on the basis of a Coulomb force under a voltage application.

In such an embodiment, an ink basically comprising inorganic or organic fine particles and a solvent is used, and the ink is converted from an adhesive state to a non-adhesive state by utilizing a difference in chargeability of the fine particles.

More specifically, in a case where the viscous substance may be prepared so that negatively chargeable fine particles (i.e., those capable of being easily charged negatively) are contained in the viscous substance, the viscous substance on the cathode side becomes non-adhesive to the cathode when a voltage is applied to the viscous substance. In a case where a viscous substance is prepared so that positively chargeable fine particles (i.e., those capable of being easily charged positively) are contained in the viscous substance, the viscous substance on the anode side becomes non-adhesive to the anode when a voltage is applied to the viscous substance.

(2) In another embodiment, a viscous substance is subjected to electrolysis to generate a gas on the basis of electric conduction due to a voltage application, whereby the adhesiveness of the viscous substance is changed.

In such an embodiment, a viscous substance may be prepared so that it is caused to generate a gas in the neighborhood of one electrode under a voltage application, whereby the viscous substance becomes non-adhesive to the electrode due to the gas.

When a solvent such as water, alcohol, and glycol; or a solvent containing an electrolyte such as sodium chloride and potassium chloride dissolved therein, is contained in the viscous substance, the viscous substance is caused to generate a gas due to electrolysis. The electric resistance of the viscous substance may preferably be as low as possible. More specifically, the volume resistivity of the viscous substance may preferably be $10^5$ ohm.cm or below, and more preferably $10^4$ ohm.cm or below. If the volume resistivity exceeds $10^5$ ohm.cm, the quantity of electric conduction becomes too small, or a high voltage is required in order to prevent a decrease in the quantity of electric conduction.

In the present invention, it may be considered that the mechanism of the change in the ink from an adhesive state to a non-adhesive state is either one of the above-mentioned two mechanisms (1) and (2). It is possible that the mechanism of the viscous substance-supplying method according to the present invention is a combination of the above-mentioned mechanisms (1) and (2).

Incidentally, with respect to a portion of an ink layer supplied with a voltage (i.e., a portion corresponding to the electroconductive portion), almost the whole ink layer along the thickness direction may be transferred to a prescribed electroconductive member (hereinafter such transfer of an ink is referred to as "bulk transfer").

If the viscous substance used in the present invention is a liquid having a low viscosity such as water and alcohol, the cohesive force is weak, whereby it is difficult to obtain a suitable adhesiveness.

More specifically, the viscous substance used in the present invention may preferably satisfy at least one of the following properties.

(1) Adhesiveness

A sample of the viscous substance (reflection density: 1.0 or larger) is caused to adhere to a stainless steel plate of 1 cm×1 cm in size coated with platinum plating which is vertically disposed, so that a 2 mm-thick viscous substance layer is formed on the stainless steel plate, and is left standing as it is for 5 sec. in an environment of a temperature of 25° C. and a moisture of 60%. Then, the height of the viscous substance layer is measured Through the measurement, the viscous substance used in the present invention may preferably be substantially held on the stainless steel plate. More specifically, the above-mentioned height of the viscous substance layer may preferably be 50% or more, and more preferably 80% or more, based on the original height thereof.

(2) Adhesiveness under no voltage application

A 2 mm-thick layer of a sample of the viscous substance is sandwiched between two stainless steel plates each of 1 cm×1 cm in size coated with platinum plating which are vertically disposed, and the stainless steel plates are separated from each other at a peeling speed of 5 cm/sec under no voltage application. Then, the areas of both plates covered with the viscous substance are respectively measured. Through the measurement, in the viscous substance used in the present invention, the respective plates may preferably show substantially the same adhesion amount of the viscous substance. More specifically, each plate may preferably show an area proportion of 0.7–1.0, in terms of the proportion of the area measured above to the area of the plate which has originally been covered with the above-mentioned 2 mm-thick viscous substance layer.

(3) Adhesiveness under voltage application

A sample viscous substance (reflection density: 1.0 or larger) is applied on a stainless steel plate of 1 cm×1 cm coated with platinum plating to form an about 2 mm-thick viscous substance layer, and another stainless steel plate coated with platinum plating having the same size as described above is, after the reflection density thereof is measured, disposed on the viscous substance layer, and these two stainless steel plates are vertically disposed. Then, a voltage of +30 V was applied between the above-mentioned two stainless steel plates sandwiching the 2 mm-thick viscous substance layer, while one of the stainless steelplates is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through the measurement, in the viscous substance used in the present invention, it is preferred that the coloring content of the viscous substance is not substantially transferred to one of the above-mentioned two electrodes, and the viscous substance selectively adheres to the other electrode. More specifically, with respect to the electrode to which substantially no viscous substance adheres, the increase in the reflection density may preferably be 0.3 or smaller, more preferably 0.1 or smaller, when the above-mentioned viscous substance per se has a reflection density of 1.0 or larger.

When the viscous substance adhesiveness of the viscous substance is changed due to Coulomb force, charged or chargeable fine particles may be used as the entirety or a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2SiO_3$, mesodisilicic acid $H_2Si_2O_5$, mesotrisilicic acid $H_4Si_3O_8$ mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, montmorillonite particles, fluorine-containing resin particles, etc.

Further, polymer particles containing various charge-controlling agents used as electrophotographic toners (positively chargeable or negatively chargeable) may be used for such a purpose.

The above-mentioned fine particles may generally have an average particle size of 100 microns or smaller, preferably 0.1–20 microns, more preferably 0.1–10 microns. The fine particles may generally be contained in the viscous substance in an amount of 1 wt. part or more, preferably 3–90 wt. parts, more preferably 5–60 wt. parts, per 100 wt. parts of the viscous substance.

Examples of the solvent contained in the viscous substance according to the present invention may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, γ-butyrolactone, propylene carbonate, 1,2,6-hexanetriol, dipropylene glycol, hexylene glycol, etc. These compounds may be used singly or as a mixture of two or more species as desired. The solvent may preferably be contained in an amount of 40–95 wt. parts, more preferably 60–85 wt. parts, per 100 wt. parts of the viscous substance.

In an embodiment of the present invention, in order to control the viscosity of the viscous substance, a polymer soluble in the above-mentioned solvent may be contained in an amount of 1–90 wt. parts, more preferably 1–50 wt. parts, particularly preferably 1–20 wt. parts, per 100 wt. parts of the viscous substance.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In a case where the adhesiveness of the viscous substance is changed by the generation of a gas due to electrolysis, the solvent may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The amounts of the solvent and fine particles to be contained in the viscous substance are the same as those described above.

Particularly, when water or an aqueous solvent is used as the solvent, hydrogen gas is liable to be generated at the cathode side. When water and another solvent are mixed, the water content may preferably be 1 wt. part or more, more preferably 5–99 wt. parts, per 100 wt. parts of the viscous substance.

In the case of the viscous substance capable of generating a gas due to electrolysis, the viscous substance can also contain fine particles of, e.g., silica, carbon fluoride, titanium oxide or carbon black, in addition to those described hereinabove.

In a preferred embodiment of the viscous substance usable in the present invention, in view of the viscoelastic characteristic of the viscous substance, the entirety or a part of the fine particles comprise swelling particles (i.e., particles capable of being swelled) which are capable of retaining the above-mentioned solvent therein.

Examples of such swelling particles may include: fluorinated mica such as Na-montmorillonite, Ca-montmorillonite, 3-octahedral synthetic smectites, a-hectorite, Li-hectorite, Na-taeniolite, Na-tetrasilicici mica and Li-taeniolite; synthetic mica, silica, etc.

The above-mentioned fluorinated mica may be represented by the following general formula (1).

$$W_{1-\frac{1}{3}}(X,Y)_{2.5-3}(Z_4O_{10})F_2 \qquad (1),$$

wherein W denotes Na or Li; X and Y respectively denote an ion having a coordination number of 6, such as $Mg^{2+}$, $Fe^{2+}$, $Ni^{2}$, $Mu^{2+}$, $Al^{3+}$, and $Li^{+}$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 0.1–20 microns, more preferably 0.8–8 microns. The swelling and most particle content can be the same as that described above with respect to the fine particles, but may more preferably be 8–60 wt. parts per 100 wt. parts of the viscous substance. It is also preferred to use swelling particles having charges on their surfaces The viscous substance-supplying method according to the present invention may be used in a step of supplying an ink to a printing plate in the art of printing. In such a case, the ink corresponds to the above-mentioned viscous substance.

The ink used herein may be obtained by incorporating a colorant in the above-mentioned viscous substance. The colorant may comprise a dye or a pigment generally used in the field of printing or recording, such as carbon black. The colorant content may preferably be 0.1–40 wt. parts, more preferably 1–20 wt. parts, per 100 wt. parts of the ink. Instead of or in combination with the colorant, a color-forming compound capable of generating a color under a voltage application can be contained in the ink.

Figure 3:
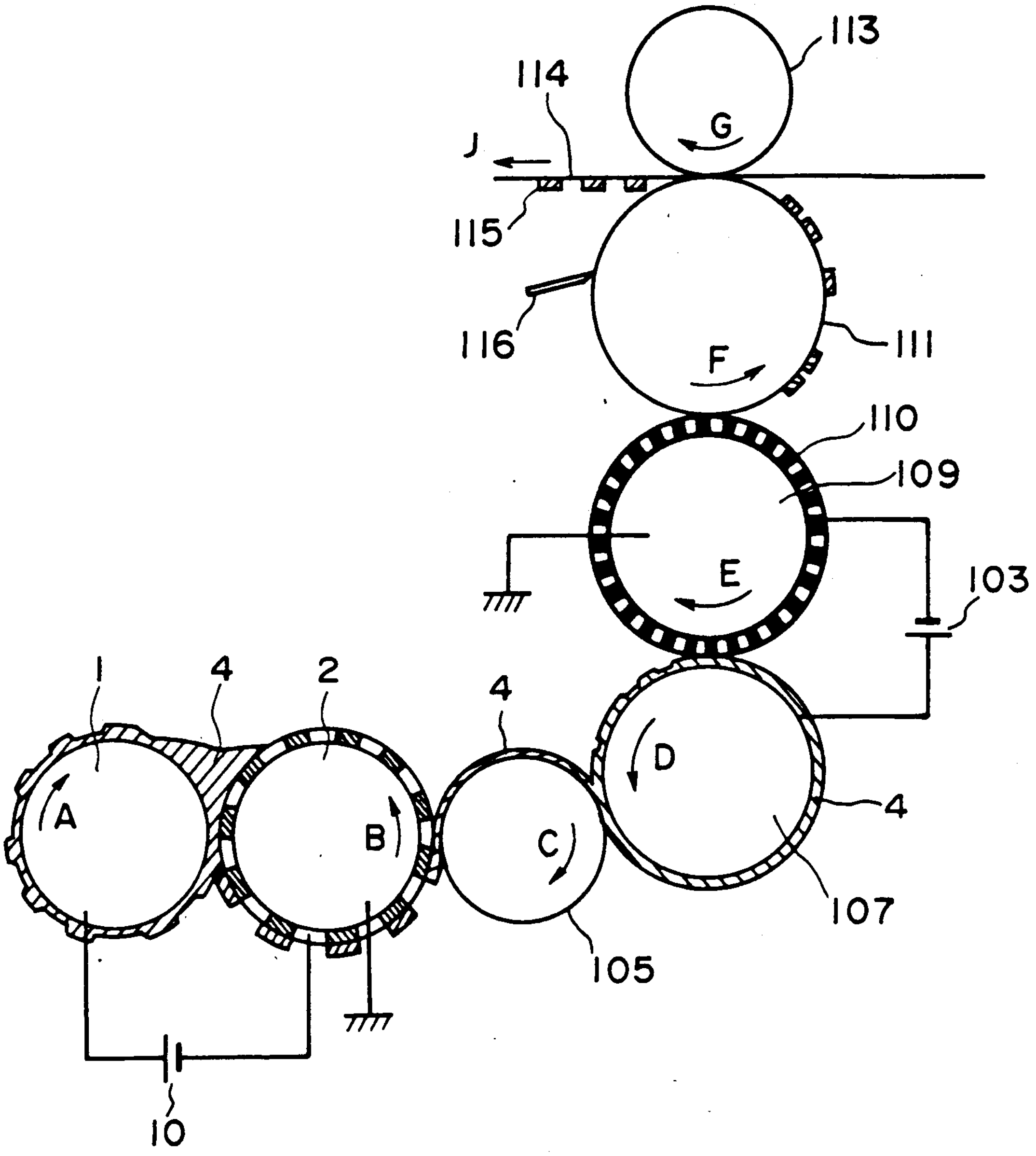
FIG. 3 is a schematic side sectional view showing an embodiment of the image forming apparatus according to the present invention.

FIG. 3 shows an embodiment of the printing apparatus utilizing the viscous substance (ink)-supplying method according to the present invention. Referring to FIG. 3, in such an apparatus, a suitable amount of a viscous substance 4 is provided to a first intermediate roller 105 rotating in the arrow c direction by an ink amount control means according to the present invention comprising electrodes 1 and 2. The first intermediate roller 105 used in such an embodiment comprises an elastomeric material such as silicone rubber, and the roller 105 is rotated at a peripheral speed lower than that of the electrode 2 while contacting the electrode 2.

The first intermediate roller 105 as shown in FIG. 3, may also function as a smoothing roller. Accordingly, in the embodiment as shown in FIG. 3, the ink 4 transferred to the first intermediate roller 105 forms an ink layer having a substantially uniform thickness. The first intermediate roller 105 can also comprise a metal such as aluminum, copper and stainless steel, in addition to the above-mentioned elastomeric material such as silicone rubber.

In contact with the layer of the ink 4 formed on the first intermediate roller 105, there is disposed a second intermediate roller 107 rotating in the arrow D direction so that it contacts the ink layer 4, whereby an ink layer is formed on the surface of the second intermediate roller 107. The second intermediate roller 107 may preferably comprise an electroconductive material such as an electroconductive rubber, and a metal including aluminum, copper, stainless steel, etc.

In contact with the ink layer 4 formed on the second intermediate roller 107, there is disposed a printing plate 110 wound about a plate roller 109 rotating in the arrow E direction. A portion of the ink layer disposed on the second intermediate roller 107 is transferred to the printing plate 110 corresponding to the image portion of the printing plate 110, thereby forming an ink pattern. The printing plate 110 may be known one such as those for offset printing, gravure printing, letterpress printing, etc.

Further, the printing plate 110 comprise an electroconductive portion and an insulating portion In such a case, for example, a voltage may be applied between the printing plate 110 and the second intermediate roller 107 by means of an electric power supply 103 to convert the ink 4 to a non-adhesive state at the electroconductive portion of the plate 110, whereby the ink 4 is selectively attached to the insulating portion thereof The thus formed ink pattern formed on the printing plate 110 is then transferred to a blanket cylinder 111, which rotates in the arrow F direction while contacting the printing plate 110 under pressure Further, the ink pattern disposed on the blanket cylinder 111 is transferred to a recording medium (or a medium to be recorded) 114 such as a sheet of paper, cloth or metal, moving in the arrow J direction and passing between the blanket cylinder 111 and an impression cylinder 113, which rotates in the arrow G direction while contacting the blanket cylinder 111 under pressure, whereby an image 115 corresponding to the above-mentioned ink pattern is formed on the recording medium 114.

It is also possible that the ink pattern formed on the printing plate 110 is directly transferred to the recording medium 114 in some cases without providing the blanket cylinder 111. However, when the blanket cylinder 111 is provided, an image having the same pattern as that of the printing plate 110 may be obtained on the recording medium 114.

In FIG. 3, cleaning means 116 such as a blade is disposed, as desired, so that it contacts the peripheral surface of the blanket cylinder 111. The cleaning means 116 may scrape the remaining ink from the peripheral surface of the blanket cylinder 111

Hereinbelow, the present invention will be explained in more detail with reference to the following example.

EXAMPLE 1

By using electrodes 1 and 2 in a roller form as shown in FIG. 1, the amount of a viscous substance to be supplied to at least one of the rollers 1 and 2 was controlled.

Referring to FIG. 1, the electrode 1 comprises a 40 mm-diameter roller of stainless steel coated with platinum plating, and the electrode 2 comprises a 40 mm-diameter roller *2c* of iron coated with hard chromium plating, about which a pattern sheet *2d* having a stripe pattern had been wound. The clearance d between the roller electrodes 1 and 2 was 1 mm.

The pattern sheet *2d* used herein had been prepared by fusion-bonding a 18 micron-thick plate of Cu to a 50 micron-thick polyimide sheet, applying onto the Cu plate a resin (photoresist, trade name: JEOCOAT #9000, mfd. by Jeck K.K.) generally used for a printed circuit board, subjecting the resultant coating (dry thickness=15–25 microns) to pattern exposure, and removing the needless resin by etching, so as to provide a prescribed stripe pattern The prepared pattern sheet *2d* was bonded to the iron roller *2c* by using a double-coated adhesive tape. In this instance, there were provided two kinds of pattern sneets *2d* wherein the area ratio between the electroconductive portion *2a* (Cu portion) and the insulating portion *2b* (resin portion) were 1:1 (width of electroconductive portion = 100 microns, width of insulating portion = 100 microns) and 3:1 (width of electroconductive portion = 300 microns, width of insulating portion = 100 microns), respectively.

Separately, 200 g of glycerin and 140 g of lithium taeniolite ($LiMg_2Li(Si_4O_{10})F_2$) having an average particle size of 2.5 microns were kneaded in a homogenizer at 10,000 rpm for 30 min., and then 200 g of water was added thereto and mixed by means of a roll mill to prepare a gray colloid sol in the form of an amorphous solid, as a viscous substance.

In an apparatus as shown in FIG. 1 using the above-mentioned pattern sheet *2d* (the above-mentioned area ratio = 1:1), the viscous substance 4 prepared above was supplied to the clearance between the electrodes 1 and 2, and then the electrodes 1 and 2 were rotated in the directions of the arrows A and B, respectively, at a peripheral speed of 5 mm/sec., while no voltage was applied therebetween. As a result, the viscous substance 4 was attached to both of the roller electrodes 1 and 2.

Then, the electrodes 1 and 2 were rotated in the directions of arrows A and B, respectively, at a peripheral speed of 5 mm/sec, while a DC voltage of +30 V was applied between the electrode 1 as the anode and the pattern sheet *2d* as the cathode (earth). As a result, the viscous substance 4 was not attached to the electroconductive portion *2a* (cathode) of the pattern sheet *2d,* but the viscous substance 4 was attached to a portion of the electrode 1 (anode) disposed opposite to the above-mentioned electroconductive portion *2a.* Further, at the insulating portion *2b* of the electrode 1, the viscous substance 4 was attached to both of the electrodes 1 and 2.

When the above-mentioned procedure was repeated except that the pattern sheet *2d* having the area ratio between the electroconductive portion *2a* and the insulating portion *2b* of 3:1 was used instead of having the area ratio of 1:1, the amount of the viscous substance 4 attached to the pattern sheet *2d* became ½ times that obtained in the case of the area ratio of 1:1.

Example 2

An electrode 2 was prepared by applying an insulating resin (polyester) onto a 40 mm-diameter iron roller to form thereon a 50 micron-thick polyester layer, and winding a mesh of stainless steel about the resultant coated roller There were provided two kinds of pattern sheets *2d* wherein the area ratios between the electroconductive portion (stainless steel mesh portion) and the insulating portion (polyester portion) were 3:1 and 7:1, respectively.

The meshes used herein comprises a plain cloth (or plain weave) comprising stainless steel wires of 50 microns disposed at an interval of 27 microns (for providing the area ratio of 7:1), or 50 microns (or providing the area ratio of 3:1).

The viscous substance 4 was supplied to the clearance between the electrodes 1 and 2 in the same manner as in Example 1 except that each of the electrodes 2 prepared above where used.

As a result, the viscous substance 4 was not attached to the stainless steel mesh portion of the electrode 2 but was selectively attached to the resin portion of the electrode 2, whereby the amount of the viscous substance 4 attached to the electrode was regulated. When electrode 2 having the area ratio of 3:1 between the electroconductive portion and insulating portion was used, the amount of the viscous substance 4 attached to the electrode 2 became 2 times that obtained in the case of the area ratio of 7:1.

Example 3

Printing was conducted by using a printing apparatus as shown in FIG. 3.

Referring to FIG. 3, the electrode 2 was the same as that used in Example 1. The electrode 2 was which had been prepared in the same manner as in Example 1, except that the area ratio between the electroconductive portion and the insulating portion of the pattern sheet was changed More specifically, there were provided two kinds of pattern sheets wherein the proportions of the insulating portion to the entire area thereof were 25% and 75%, respectively Both of the peripheral speeds of the electrodes 1 and 2 were 18 mm/sec, and the clearance between the electrodes 1 and 2 was 0.5 mm.

The first intermediate roller 105 was a 40 mm-diameter roller comprising silicone rubber and was disposed so that it contacted the electrode 2. The first intermediate roller 105 was rotated at a peripheral speed of 15 mm/sec.

The second intermediate roller 107 was a 40 mm-diameter cylindrical roller comprising a surface layer of an electroconductive rubber. The second intermediate roller 107 was rotated at a peripheral speed of 15 mm/sec.

The plate roller 109 comprises a 40 mm-diameter cylindrical roller of stainless steel. Around the plate roller 109, a printing plate 110 comprising an aluminum plate and an image pattern of a photohardenable vinyl-type resin disposed thereon was wound. The plate roller was rotated at a peripheral speed of 15 mm/sec. The second intermediate roller 107 was disposed so that it contacted both of the first intermediate roller 105 and the printing plate 110. Further, the blanket roller 111 had a diameter of 40 mm and comprised an aluminum roller and a silicone rubber layer wound about the surface of the aluminum roller The blanket roller 111 was rotated at a peripheral speed of 15 mm/sec In such a printing apparatus as shown in FIG. 3 including the pattern sheet having the above-mentioned area proportion of 25% constituting the electrode 2, a voltage of +30 V was applied between the electrode 1 and the grounded electrode 2, and a voltage of +25 V was applied between the second intermediate roller 107 and the grounded plate roller 109. The ink 4 used herein was one obtained by incorporating 10 wt. of carbon black in the viscous substance used in Example 1. By using the above-mentioned apparatus, printing was conducted.

As a result, the ink 4 was supplied to the printing plate 110 corresponding to the area ratio between the electroconductive portion and insulating portion of the electrode 2, and the ink 4 is attached to the insulating portion of the printing plate 110, whereby an image 115 was formed on plain paper 114.

When the above-mentioned printing procedure was repeated except that the pattern sheet of the electrode 2 having the area ratio of 75% was used instead of that having the area ratio of 25%, the amount of the ink 4 supplied to the printing plate 110 became 3 times that obtained in the case of the area ratio of 25%, whereby the resolution of the resultant image 115 was somewhat lowered.

As described hereinabove, according to the present invention, the amount of a viscous substance such as ink and adhesive to be supplied to an electrode may be regulated or controlled by the area ratio between the electroconductive portion and insulating portion of the electrode, without the influence of temperature and/or humidity.

What is claimed is:

1. A method for supplying a viscous substance, comprising the steps of:

providing a viscous substance having an adhesive characteristic which changes in corresponding to a polarity of a voltage applied thereto, wherein the viscous substance has an adhesive characteristic when no voltage is applied thereto and wherein the adhesiveness of the viscous substance is reduced when a voltage is applied thereto;

supplying the viscous substance between a pair of electrodes at least one of which has a pattern comprising an electroconductive portion and an insulating portion; and applying a voltage between the pair of electrodes to thereby attach the viscous substance to at least one of the pair of electrodes in an amount which corresponds to the ratio of the area of the electroconductive portion to the area of the insulating portion.

2. A method according to claim 1, wherein one of the pair of electrodes is a cathode and the other of the pair of electrodes is an anode and wherein said applying step further comprises the step of causing the viscous substance to lose its adhesiveness of the cathode.

3. A method according to claim 1, wherein one of the pair of electrodes is a cathode and the other of the pair of electrodes is an anode and wherein said applying step further comprises the step of causing the viscous substance to lose its adhesiveness on the anode.

4. A method according to claim 1, wherein the pair of electrodes comprise rollers.

5. A method according to claim 1, wherein the pattern is a regular pattern.

6. A method according to claim 1, wherein the electrode having a pattern comprises an insulating member and a metal mesh bonded thereon.

7. A method according to claim 1, wherein the pattern is in the form of stripes.

8. An image forming method, comprising the steps of:

providing an ink having an adhesive characteristic which changes in correspondence to a polarity of a voltage applied thereto, wherein the ink has an adhesive characteristic when no voltage is applied thereto and wherein the adhesiveness of the ink is reduced when a voltage is applied thereto;

supplying the ink between a pair of electrodes at least one which has a pattern comprising an electroconductive portion and an insulating portion;

applying a voltage between the pair of electrodes to thereby attach the ink to at least one of the pair of the electrodes;

supplying the ink attached to the at least one electrode to a printing plate having a pattern of ink receptibility; and transferring the ink from the printing plate to a transfer-receiving medium to form thereon an ink image corresponding to the pattern of the ink receptibility.

9. A method according to claim 8, wherein the printing plate has a pattern comprising an electroconductive portion and an insulating portion, and wherein said step of supplying the ink attached to the at least one electrode to the printing plate comprises the step of supplying the printing plate with a voltage.

10. A method according to claim 8, wherein one of the pair of electrodes is a cathode and the other of the pair of electrodes is an anode and wherein said applying step further comprises the step of causing the ink to lose its adhesiveness on the cathode.

11. A method according to claim 8, wherein one of the pair of electrodes is a cathode and the other of the pair of electrodes is an anode and wherein said applying step further comprises the step of causing the ink to lose its adhesiveness on the anode.

12. An image forming apparatus, comprising:

a pair of electrodes at least one of which has a pattern comprising an electroconductive portion and an insulating portion;

means for supplying an ink between the pair of electrodes;

a power supply for applying a voltage between the pair of electrodes; and a printing plate having a pattern of ink receptibility;

whereby the ink attached to at least one of the pair of electrodes is supplied to the printing plate to form thereon an ink pattern corresponding to the pattern of ink receptibility.

13. An apparatus according to claim 12, further comprising a power supply for applying a voltage to said printing plate, said printing plate having a pattern comprising an electroconductive portion and an insulating portion.

14. An apparatus according to claim 12, wherein said pair of electrodes comprise rollers.

15. An apparatus according to claim 12, wherein said pattern of the electrode is a regular pattern.

16. An apparatus according to claim 12, wherein said electrode having a pattern comprises an insulating member and a metal mesh bonded thereon.

17. An apparatus according to claim 12, wherein said pattern of the electrode is in the form of stripes.

* * * * *

UNITED STATES PATENT AND TRADEMARK OFFICE
CERTIFICATE OF CORRECTION

PATENT NO. : 5,041,843
DATED : August 20, 1991
INVENTOR(S) : NOBORU TOHYAMA, ET AL.

It is certified that error appears in the above-identified patent and that said Letters Patent is hereby corrected as shown below:

Title Page;

At [54] TITLE:

TITLE should read -- METHOD AND APPARATUS FOR TRANSFERRING A PATTERN OF VISCOUS SUBSTANCE TO AN ELECTRODE IN AN AMOUNT CORRESPONDING TO THE RATIO OF A CONDUCTIVE AREA TO AN INSULATING AREA ON THE ELECTRODE --

At [56] References Cited - U.S. PATENT DOCUMENTS:

Line 2, "Kuhashi" should read -- Kohashi --

| | | | |
|---|---|---|---|
| Insert -- | 4,205,320 | 5/1980 | Fujii............346/1.1 |
| | 3,946,671 | 3/1976 | Metcalfe, et al..101/426 |
| | 4,833,990 | 5/1989 | Hirt, et al......101/130 -- |

At [56] References Cited - FOREIGN PATENT DOCUMENTS:

| | | | |
|---|---|---|---|
| Insert -- | 2601900 | 1/1988 | France |
| | 2201653 | 4/1974 | France |
| | 0336238 | 10/1989 | European |
| | 3633758 | 4/1988 | Germany |
| | 3535025 | 4/1987 | Germany |
| | 2925096 | 1/1980 | Germany |
| | 1436661 | 11/1969 | Germany -- |

UNITED STATES PATENT AND TRADEMARK OFFICE

CERTIFICATE OF CORRECTION

PATENT NO. : 5,041,843

DATED : August 20, 1991

INVENTOR(S) : NOBORU TOHYAMA, ET AL.

It is certified that error appears in the above-identified patent and that said Letters Patent is hereby corrected as shown below:

COLUMN 1:

Lines 1-8, TITLE should read -- METHOD AND APPARATUS FOR TRANSFERRING A PATTERN OF VISCOUS SUBSTANCE TO AN ELECTRODE IN AN AMOUNT CORRESPONDING TO THE RATIO OF A CONDUCTIVE AREA TO AN INSULATING AREA ON THE ELECTRODE --;

Line 29, "therefrom" should read -- therefrom. --;

Line 35, "technique" should read -- techniques --;

Line 49, "without a" should read -- without being influenced by a --;

Line 67, "lease" should read -- least --.

COLUMN 2:

Line 52, "view" should read -- views --.

COLUMN 3:

Line 29, "one" should be deleted;

Line 32, "one" should be deleted;

Line 35, "the and;" should read -- the projections; and --;

Line 36, "one" should be deleted;

Line 49, "a" should be deleted;

Line 50, "one," should be deleted.

UNITED STATES PATENT AND TRADEMARK OFFICE
CERTIFICATE OF CORRECTION

PATENT NO. : 5,041,843
DATED : August 20, 1991
INVENTOR(S) : NOBORU TOHYAMA, ET AL.

It is certified that error appears in the above-identified patent and that said Letters Patent is hereby corrected as shown below:

COLUMN 4:

Line 38, "more" should read -- and more --;

Line 39, "and" should be deleted.

COLUMN 6:

Line 31, "sured" should read -- sured. --.

COLUMN 7:

Line 42, "$H_4Si_3O_8$*mesotetrasilicic acid H6*$Si_4O_{11}$;" should read -- $H_4Si_3O_8$, mesotetrasilicic acid $H_6Si_4O_{11}$; --.

COLUMN 8:

Line 24, "carrageenah," should read -- carrageenan, --.

COLUMN 9:

Line 8, "Na-tetrasilicici" should read -- Na-tetrasilicic --;

Line 13, "$W_{1-⅓}(X,Y)_{2.5-3}(Z_4O_{10})F_2$ (1)," should read -- $W_{1-⅓}(X,Y)_{2.5-3}(Z_4O_{10})F_2$ (1), --;

Line 21, "more preferably" should read -- more preferably 0.8-15 microns, and most preferably -- and "and most" should be deleted;

Line 26, "surfaces" should read -- surfaces. --.

UNITED STATES PATENT AND TRADEMARK OFFICE
CERTIFICATE OF CORRECTION

PATENT NO. : 5,041,843 Page 4 of 5

DATED : August 20, 1991

INVENTOR(S) : NOBORU TOHYAMA, ET AL.

It is certified that error appears in the above-identified patent and that said Letters Patent is hereby corrected as shown below:

COLUMN 10:

Line 10, "pattern." should read -- pattern thereon. --;

Line 11, "known" should read -- a known --;

Line 14, "comprise" should read -- comprises --;

Line 25, "pressure" should read -- pressure. --;

Line 46, "blanket cylinder 111" should read -- blanket cylinder 111. --.

COLUMN 11:

Line 2, "pattern" (first occurrence) should read -- pattern. --;

Line 55, "roller" should read -- roller. --;

Line 60, "comprises" should read -- comprise --;

Line 63, "(or" should read -- (for --;

Line 68, "where" should read -- was --.

COLUMN 12:

Line 23, "respectively" should read -- respectively. --;

Line 49, "15 mm/sec" should read -- 15 mm/sec. --

UNITED STATES PATENT AND TRADEMARK OFFICE

CERTIFICATE OF CORRECTION

PATENT NO. : 5,041,843

DATED : August 20, 1991

INVENTOR(S) : NOBORU TOHYAMA, ET AL.

It is certified that error appears in the above-identified patent and that said Letters Patent is hereby corrected as shown below:

COLUMN 13:

Line 18, "corresponding" should read --correspondence--;

Line 39, "of" should read --on--.

COLUMN 14:

Line 51, "comprise" should read -- comprises --.

COLUMN 10:

LIne 21, "thereof" should read --thereof.--.

Signed and Sealed this

Ninth Day of June, 1992

Attest:

DOUGLAS B. COMER

*Attesting Officer*

*Acting Commissioner of Patents and Trademarks*